Feb. 9, 1971   HIROSHI TOMINAGA ET AL   3,561,239
APPARATUS FOR FORMING METALS BY MEANS OF JET LIQUID
Original Filed March 9, 1966   3 Sheets-Sheet 1

INVENTORS
HIROSHI TOMINAGA
MASANOBU TAKAMATSU
BY
*McGlew and Toren*
ATTORNEYS

United States Patent Office 3,561,239
Patented Feb. 9, 1971

3,561,239
APPARATUS FOR FORMING METALS BY MEANS OF JET LIQUID
Hiroshi Tominaga and Masanobu Takamatsu, Yokohama-shi, Japan, assignors to Tokyu Sharyo Seizo Kabushiki Kaisha, Yokohama-shi, Japan
Continuation of application Ser. No. 533,024, Mar. 9, 1966. This application Aug. 28, 1969, Ser. No. 856,880
Claims priority, application Japan, Mar. 18, 1965, 40/15,335; Apr. 23, 1965, 40/23,682; June 17, 1965, 40/35,756; Aug. 27, 1965, 40/51,960, 40/51,961
Int. Cl. B21d 26/04
U.S. Cl. 72—60        1 Claim

ABSTRACT OF THE DISCLOSURE

A method of forming metal using a mold cavity member comprises placing the metal in association with the cavity member in a position such that it can be deformed into the cavity thereof and directing a liquid first through a narrowing passage to increase the velocity and impact force and thereafter directing the liquid at high impact force and velocity against the metal to shape it into the form of the mold cavity.

The apparatus for carrying out the invention includes a liquid pressure chamber and a plunger which is slidable in the chamber but which is exposed at the exterior of the chamber to permit it to be moved rapidly by striking it. The movement of the plunger causes the displacement of the liquid in the chamber through a narrowing passage to increase its velocity and impact force. The chamber for generating the high impact force of the liquid and increased velocity of the liquid is located adjacent a mold cavity member so that the liquid might be injected into the mold cavity member to deform the metal to be formed. Various embodiments for increasing the velocity of the liquid and its impact force are disclosed including a single narrowing passage and a double passage construction, as well as a divergent passage construction.

---

This application is a continuation of Ser. No. 533,024, filed Mar. 9, 1966, now abandoned.

The present invention relates to an apparatus for forming metals by means of a jet liquid.

The bulging of a metal tube using a high hydraulic pressure is referred to as hydraulic bulging. Owing to a static hydraulic pressure used for this forming process, the apparatus employed must be made of very high strength so that it is bulky and expensive, whereas the working efficiency thereof is generally low. Further, the construction of sealed hydraulic pressure chamber of the apparatus of this kind requires elaborate sealing means to prevent the working liquid of high pressure from leaking out.

It is the object of the persent invention to generate impulsive hydraulic pressure waves in a liquid, particularly in water, thereby carrying out forming such as stamping, deep drawing, punching, bending or the like. The forming apparatus according to the invention, thus utilizing a dynamic hydraulic pressure (rate of flow, velocity of flow) due to jet of liquid, requires no sealed chamber as described above, and makes it possible to carry out forming by means of an open chamber and with a resultant simplification of the apparatus.

It is another object of the invention to lower the yield point of the metal to be formed by heating it prior to forming thereby improving the workability thereof, and thus to make it possible to form metal which is difficult to cold work because of its large thickness or complicated shape.

It is still another object of the invention to effect forming at a desired hydraulic pressure by giving a proper shape to the passage for transmitting shock waves of the liquid so as to increase or decrease the hydraulic pressure.

Finally, another object of the invention is to control and adjust wave form, pressure value, position and time of application of the shock waves in a wide range by arranging another medium for shock waves in the passage and by transmitting at least a portion of the shock waves through said medium.

Several embodiments of the invention will be explained in connection with the accompanying drawings, in which.

Figure 1:
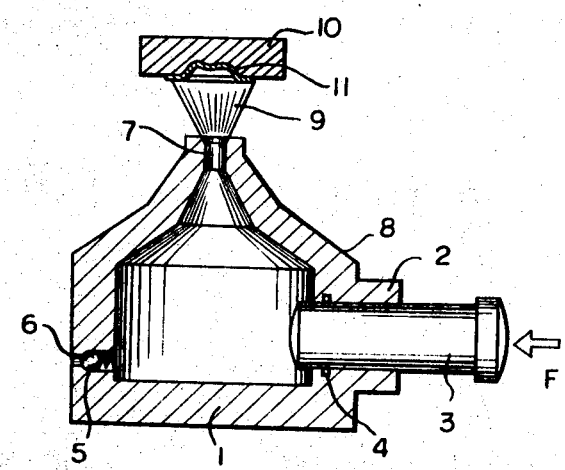
FIG. 1 is a longitudinal section of a first embodiment of the invention.

Referring now to FIG. 1, a hydraulic pressure chamber 1 has an integral cylinder part 2 at a side thereof in which a plunger 3 is slidably guided. A packing ring 4 is arranged so as to seal liquid-tightly the gap between the cylinder part 2 and the plunger 3. The plunger 3 is in a position to be struck with impact force F by means of an impacting means such as air punch and to compress a liquid such as water (hereinafter referred to as water) within the hydraulic pressure chamber 1. At other side of the hydraulic pressure chamber 1 is provided a pipe 6 to be connected via a check valve 5 with a water source (not shown) of substantially constant pressure such as city water. The check valve 5 permits water only to flow into the hydraulic pressure chamber 1.

The water jet forming apparatus 8 as described above operates as follows: After water, which is fed through the pipe 6 and the check valve 5, has filled the hydraulic pressure chamber 1, it begins to flow out through the jet nozzle 7. Subsequently, when the plunger 3 is impulsively forced into the hydralic pressure chamber 1 by impact force F, the pressure of water within the hydraulic pressure chamber 1 rises abruptly to a high value, for example, several hundred atmospheric pressures in several hundred microseconds, so that the water gushes forcibly from the jet nozzle 7.

The force of water which is directed at the jet nozzle 7 is employed to form metal parts. Impulse energy given by the plunger 3 is transmitted in the water in the form of shock waves of high pressure, and causes the mean value of the water pressure to rise in a moment. The product of quantity of water gushing from the jet nozzle 7 and pressure thereof is nearly proportional to the energy given to the water, while velocity of the water gushing from the jet nozzle 7 is nearly in proportion to square root of the water pressure (Bernoulli's theorem). When a certain quantity of the jet water strikes against an object at a certain velocity, the force exerted on the object by the jet water is proportional to the product of the velocity of said jet and the quantity thereof. Accordingly, if the object is subjected to stress above its yield point by the force it will be changed in shape.

The forming device of the invention includes a mould plate 10 such as a die for deep drawing or punching which is arranged opposite to the jet nozzle 7 and a metal plate 11 to be formed is arranged on the plate over a mold cavity therein. The plate 10 is then deep drawn, punched or bent by the jet water 9. In practice, shock waves are generated by the plunger 3 once or several times upon forming the metal plate 11.

Figure 2:
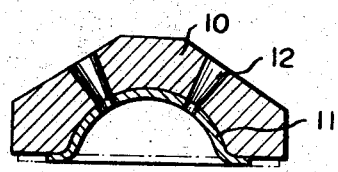
FIGS. 2 and 7 illustrate various molds and arrangements for forming.
Figure 3:
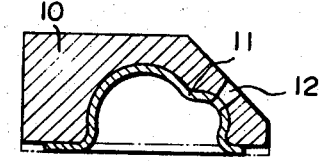

In order to accomplish punching besides drawing or bending, die holes 12 can be provided on a mould 10′ as shown in FIG. 2. Further, for carrying out drawing and punching by a split mould the mould 10′ can be divided into two and provided with a die hole 12 as shown in FIG. 3

Figure 4:
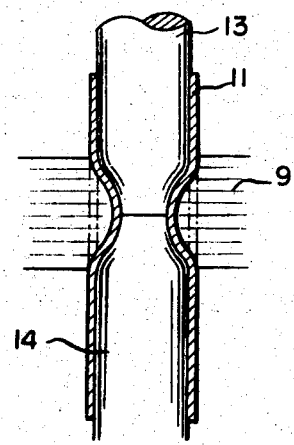
Figure 5:
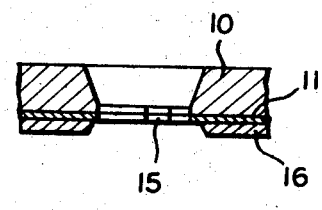
Figure 6:
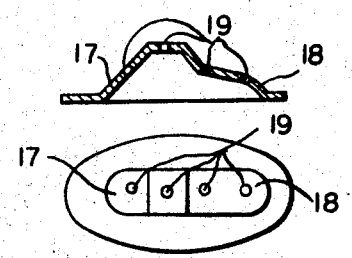

In order to contract a portion of a metal pipe 11, an upper mould 13 and a lower mould 14, shown in FIG. 4, are used and the jet water 9 is applied on the outside of the portion to be contracted. For punching a hole 15 of complex configuration on a metal plate 11, it is necessary to hold the metal plate 11 on the mould 10′′′ by means of a holder piece 16, as shown in FIG. 5. Further, according to the present invention, it is possible using suitable molds and backing portions of molds to punch holes 19 on different inclined surfaces 17 and curved surfaces 18 perpendicularly to the respective surfaces, as shown in FIG. 6.

Figure 7:
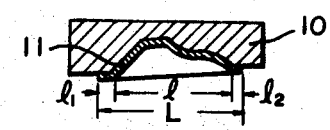

In usual drawing, a holding pad is used to hold a metal plate to be worked on a die. According to the invention, however, the holding pad becomes unnecessary and thus results in a simplification of the construction of the apparatus. The jet water pushes the portions $l_1$, $l_2$ of the metal plate 11 against the die 10′′′, as shown in FIG. 7, when the mold is constructed so that area L of the metal plate to be subjected to the jet water is dimentioned larger than the orthogonal projection area $l$ of the forming portion of the die. Saving in the material corresponding to the portion held by the holding pad also can be attained.

Prior to the working mentioned above, the material is preferably heated in the red-hot state so as to lower the yield point thereof, whereby workability of the material is improved so that working of a thick plate material difficult of cold working or complex working is made possible. In this case, since working by jet water is finished in a moment, for example, in several microseconds, the heated material only is slightly cooled so that working is not difficult. In the working of steel material, hardening effect is attainable by using high-carbon steel and by quenching it with water immediately after working. In case that hardening is unnecessary, a usual low-carbon steel is usable. Further, hardenability and workability can be adjusted by using a quenching oil as jet liquid.

Figure 8:
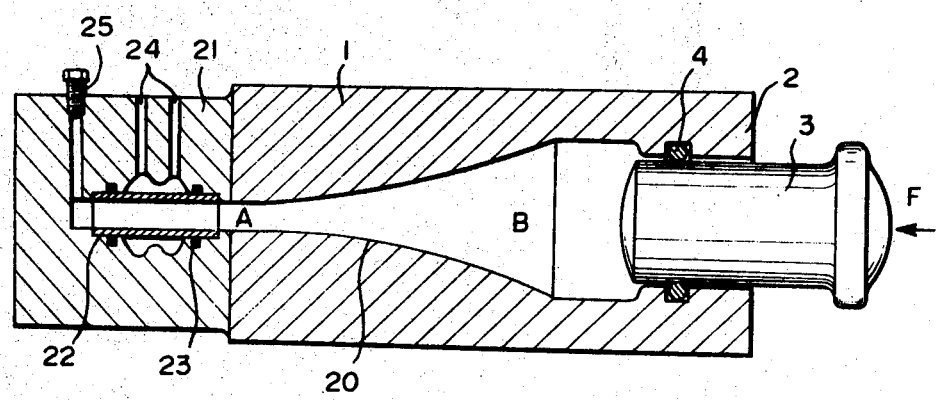
FIG. 8 is a longitudinal section of a second embodiment.
Figure 9:
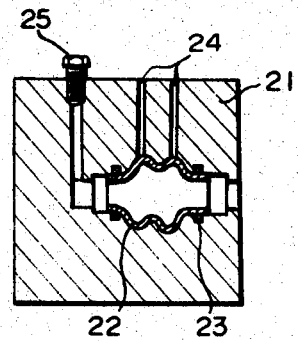
FIG. 9 shows a part of the apparatus in FIG. 8 after forming.
Figure 10:
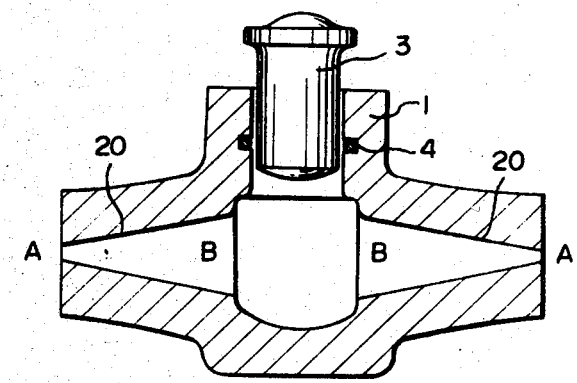
FIG. 10 is a longitudinal section of a third embodiment.

In FIGS. 8 to 10, 1′ designates a hydraulic pressure chamber, 2 a cylinder part, 3 a plunger, 4 a packing ring, F impact force to be applied to the plunger 3 respectively. A passage 20 filled with water of the hydraulic pressure chamber 1 in FIG. 8 ends in an opening A as a jet nozzle. In FIG. 8, one opening is provided for the pressure chamber 1′′ whereas plural openings may be provided as shown in FIG. 10. The passages 20 are shaped to decrease in sectional area gradually from the chamber side B thereof to the opening A. The passages 20 may have a circular or a polygonal section wide portion which is made conical toward the opening A, A. In FIG. 9 21 designates a mould in which a metal tube 22 to be worked is held. Packing rings 23 serve to prevent the water from leaking out. Air holes 24 communicate the inner space of the mould 1 with the atmosphere. 25 designates an exhaust plug for exhausting air bubbles contained in the water prior to working.

Shock waves generated by the struck plunger 3 travel from B to A in the passage 20 at travelling velocity determined in accordance with density and elasticity of the liquid, for example, at a velocity of 1500 m./sec. in water. Now, let us suppose that there is no energy loss of the shock waves travelling from B to A in the passage 20. Then, total energies $E_B$ and $E_A$ of the shock waves passing through B and A of the passage 20 per unit time are:

$$E_B = J_B \times S_B \text{ (watt)}$$
$$E_A = J_A \times S_A \text{ (watt)}$$

where

J=energy of the shock waves passing through unit area per unit time,
S=sectional area of the passage.

Maximum value $\Delta P_{max}$ (dyne/cm.²) of the hydraulic pressure due to the shock waves is:

$$\Delta P_{max} = \sqrt{2\rho C J}$$

where $\rho$=density of the liquid,
C=velocity of sound.

Since $E_B$ is equal to $E_A$ as mentioned above, $$J_B S_B = J_A S_A$$

therefore, $$\frac{J_A}{J_B} = \frac{S_B}{S_A}$$

and $$\frac{\Delta P_{max} A}{\Delta P_{max} B} = \sqrt{\frac{J_A}{J_B}} = \sqrt{\frac{S_B}{S_A}}$$

Accordingly, the ratio of impulsive hydraulic pressure at two portions of different sectional area in the passage is inversely proportional to square root of the ratio of the sectional area. Thus, hydraulic pressure increasing with decrease of the sectional area in the passage 20 acts on the metal tube 22, and forms it in accordance with inner shape of the mould 21. Air, compressed at this time between the metal tube 22 and the mould 21, may escape through air holes 24 without obstructing forming of the metal tube. FIG. 9 illustrates the metal tube 22 after working. The worked tube then will be taken out from the disassembled mould. Such construction of the hydraulic pressure chamber 1, having the converging passage 20 towards the opening A, makes it possible to obtain a desired high pressure, and permits rational design, since the wall thickness of the chamber 1 naturally increases towards the opening A. In the embodiment mentioned above, sectional area of the passage 20 decreases from B to A, but the reverse, if necessary, is also possible.

Figure 11:
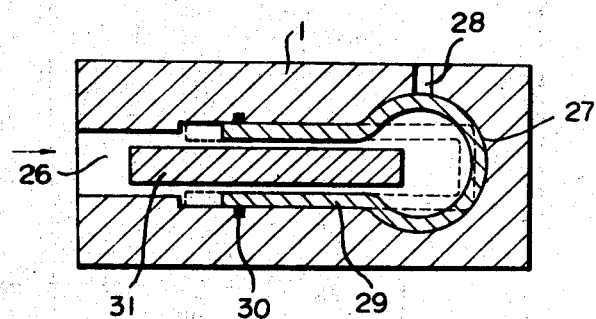
FIG. 11 is longitudinal section of a fourth embodiment.
Figure 12:
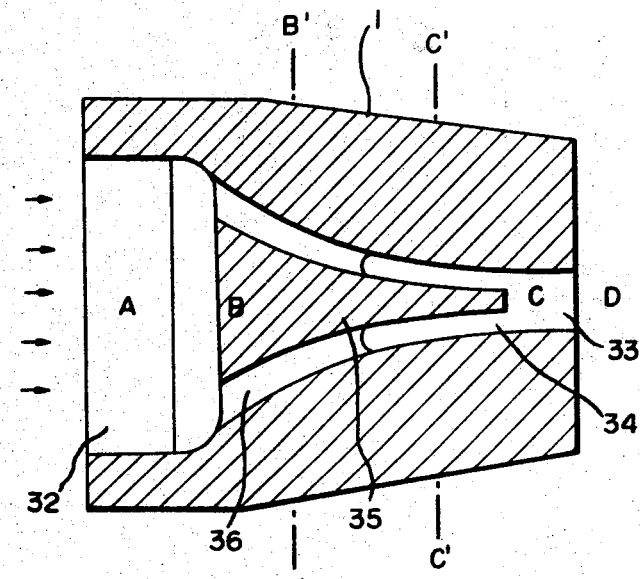
FIG. 12 is a longitudinal section of the passage portion of the fourth embodiment.
Figure 13:
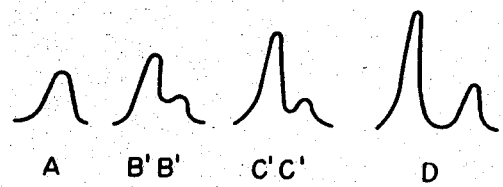
FIG. 13 illustrates forms of shock waves at different positions in the passage.

A hydraulic pressure chamber 1′′′ in FIG. 11 comprises a passage 26 for shock waves and a mould space or cavity 27 for forming. A material after working is designated with 29. Air holes 28 and packing rings 30 correspond to 24 and 23 in FIG. 8. A solid medium 31 for travelling shock waves is held in the passage 26 by means of suitable supports, and protrudes at an end into the mould space 27. A hydraulic pressure chamber 1 in FIG. 12 consists of an inlet 32, an outlet 33, a passage 34 converging or diverging towards the outlet 33 and a solid medium 35 for the shock waves held in the passage 34 with aid of supports 36. FIG. 13 shows the progressing shock waves at each position of the passage 34 in FIG. 12. It is easily understood that the shock waves change their amplitude and wave form with progress.

The advantage of arranging a solid medium in the passage will be described hereinafter. Travelling velocity C of shock waves in a medium is given as follows:

$$C = \sqrt{\frac{E}{\rho}}$$

in which

E=Young's modulus of the medium,
$\rho$=density of the medium.

The value of C is about 1500 m./sec. in water, and 1600 m./sec. in plastics. On the other hand, when shock waves travelling in a medium reach the boundary between said medium and other medium, a part thereof advances into other medium, whereas the remaining is reflected on the boundary. Therefore, in case that a solid medium 35 such as steel is arranged in the passage 34 filled with liquid such as water, as shown in FIG. 12, a part of the shock waves which has entered into the passage 34 advances within the steel 35, whereas the remaining progresses more slowly in the water, that is, at $$\frac{1500}{5000} \doteq 0.3$$

times of the velocity within the steel of the solid medium. Accordingly, with proper ratio of dimension of both mediums, it will be possible to divide shock waves into two, that is, the one progressing within the steel and the other following thereafter in the water, and to adjust the pressure ratio of both waves to a proper value as well. Thus, accurate working can be achieved by forming the material roughly with a preceeding pressure wave at first and then forming with a following stronger pressure wave. In other words, working is technically controllable.

We claim:

1. An apparatus for forming metals, comprising wall means defining a liquid pressure chamber having a cylindrical portion opening at one end and having a converging venturi portion terminating in a discharge opening of smaller dimension than said cylindrical portion, a plunger closing the opening of said cylindrical portion and being slidable in said wall means in the liquid pressure chamber and having a part exposed on the exterior of said wall means for application of a striking force thereto to cause an impulsive movement and a rapid increase of the pressure of the liquid in said liquid pressure chamber, said wall means venturi portion defining a jet nozzle for the discharge of a jet of fluid with high force upon movement of said plunger, a tubular mold cavity member arranged adjacent said wall means and having a closed end and an opening at the opposite end in axial alignment with the opening of said venturi portion discharge, said mold cavity member including a central passage for accommodating a tubular member and a cavity defined around said central passage for molding the tubular member into the configuration of the cavity, and means for mounting a part to be formed in said mold cavity in a manner to communicate the interior thereof through one end to the fluid jet exciting through said jet nozzle, said wall means venturi portion including an intermediate wall portion formed in said jet nozzle dividing said nozzle into two flow passages, said intermediate wall portion being located to receive a portion of the impact of the liquid flow by movement of said plunger.

References Cited
UNITED STATES PATENTS

| | | | |
|---|---|---|---|
| 444,413 | 1/1891 | Abell | 72—61 |
| 2,728,317 | 12/1955 | Clevenger et al. | 72—60 |
| 2,748,455 | 6/1956 | Draper et al. | 29—421 |

RICHARD J. HERBST, Primary Examiner